Patented Jan. 1, 1924.

1,479,542

UNITED STATES PATENT OFFICE.

WILHELM HIRSCHKIND, OF LOS ANGELES, CALIFORNIA, ASSIGNOR OF ONE-HALF TO INTERNATIONAL PRECIPITATION COMPANY, OF LOS ANGELES, CALIFORNIA, A CORPORATION OF CALIFORNIA.

PROCESS FOR RECOVERY OF METALS FROM THEIR ORES.

No Drawing. Application filed March 2, 1922. Serial No. 540,585.

*To all whom it may concern:*

Be it known that I, WILHELM HIRSCHKIND, a citizen of the United States, residing at Los Angeles, in the county of Los Angeles and State of California, have invented a new and useful Process for Recovery of Metals from Their Ores, of which the following is a specification.

This invention relates to the recovery of metals such as gold, silver and mercury from ores thereof, by solution of the metallic values in cyanide solution and precipitation of the metals from such solution.

Another object of the invention is to provide for carrying on the precipitating operation in such manner as to regenerate sodium cyanide or other alkali metal cyanide in the solution.

The main object of the present invention is to effect the precipitation of metals from the cyanide solution by means of a readily soluble reducing compound in place of the metallic agents such as zinc dust or shavings, and aluminum dust.

I have discovered that sodium hydrosulfite (sodium hyposulfite) having a composition represented by the formula $Na_2S_2O_4$, will precipitate metals such as gold, silver, or mercury, from cyanide solution with regeneration of the sodium cyanide according to the reaction: $2NaAg(CN)_2+Na_2S_2O_4 = 2Ag+4NaCN+SO_2$. The sulfurdioxide produced by the reaction combines with the alkali present in the cyanide solution forming sulfites. The sodium cyanide is completely regenerated to be used over and over again. If in any case the presence of the sulfites formed from the sulfurdioxide and the alkali in solution is inimical to the effective reuse of the barren liquor in cyclic operation of the process such sulfite may be eliminated from the solution in any suitable manner as, for instance, it may be oxidized to form sodium sulfate or precipitated with lime as calcium sulfite.

Further details and advantages of my process may be stated as follows:

The cyanide solution of gold, silver, mercury or any two or more of these metals is made up in any usual or suitable manner by subjecting the ore to the leaching action of the solution containing alkali metal cyanide, for example, sodium cyanide, in the presence of any agents which may be necessary and desirable for rendering the solution suitable for the particular ore to be leached, as for instance alkali such as caustic soda or caustic lime, lead salts, oxygen supplied by bubbling air through the solution, etc. After the extraction of the metals by the cyanide solution has proceeded as far as practicable, the metal-carrying solution is separated from the ore and passed to suitable precipitating apparatus where it is subjected to the precipitating operation. The sodium hydrosulfite is added either in form of a solution or in solid form to the pregnant solution in the precipitating apparatus. Inasmuch as sodium hydrosulfite absorbs oxygen very rapidly, it is desirable to remove the oxygen from the pregnant solution as far as possible in order to use the least quantity of precipitating agent. This may be accomplished by subjecting the solution to a vacuum or otherwise.

Through the action of the hydrosulfite, the metals are precipitated in pure form and settle to the bottom of the precipitating apparatus. They may be separated from the liquid by filtration or decantation, and the liquor may be returned to the leaching apparatus. Any desired modifying agent such as caustic soda, caustic lime, lead salt, oxygen (furnished by bubbling air through the solution), etc., may be added, before or during the extraction process, to the solution so returned.

An important advantage of the process as above described is that the gold and silver, for example, being precipitated in substantially pure condition free from any solid precipitating agent such as zinc, can be melted down into bullion, which is substantially pure as distinguished from the comparatively impure bullion resulting from the melting down of the precipitate produced by zinc dust or zinc shavings.

In place of sodium hydrosulfite, other soluble hydrosulfites may be used, for example, any hydrosulfite of an alkali or alkaline earth metal.

What I claim is:

1. The process which consists in precipitating gold, silver or other metal from cyanide solution thereof by adding to such solution sodium hydrosulfite.

2. The process which consists in adding on a cyanide solution of gold, silver or other metal with a soluble hydrosulfite so as to precipitate the said metal in metallic form.

3. The process which consists in precipitating gold, silver, or other metal from an alkaline cyanide solution thereof, by adding a soluble hydrosulfite to such solution, and separating the resulting precipitate from the solution.

4. The process which consists in adding alkali metal hydrosulfite to an alkaline cyanide solution of gold, silver, or other metal, so as to precipitate the said metal and to produce alkali metal cyanide, separating the precipitate from the solution, utilizing the residual solution in leaching an ore of such metal, to produce an alkaline cyanide solution of such metal for cyclic operation of the process.

5. The process which consists in leaching an ore of gold, silver or other metal with sodium cyanide solution to produce an alkaline cyanide solution of such metal, adding sodium hydrosulfite to the solution to precipitate such metal and to produce sodium cyanide in the solution, separating the precipitate from the solution, and utilizing the solution in cyclic operation of the process.

In testimony whereof I have hereunto subscribed my name this 20th day of February, 1922.

WILHELM HIRSCHKIND.